US008088985B1

(12) United States Patent
Bowser et al.

(10) Patent No.: US 8,088,985 B1

(45) Date of Patent: Jan. 3, 2012

(54) VISUAL PRESENTATION SYSTEM AND RELATED METHODS

(75) Inventors: Roger C. Bowser, Mesa, AZ (US); Lawrence A. Neal, Jr., Mesa, AZ (US)

(73) Assignee: Retinal 3-D, L.L.C., Mesa, AZ (US)

( * ) Notice: Subject to any disclaimer, the term of this patent is extended or adjusted under 35 U.S.C. 154(b) by 226 days.

(21) Appl. No.: 12/425,214

(22) Filed: Apr. 16, 2009

(51) Int. Cl.
*A63H 5/00* (2006.01)

(52) U.S. Cl. ........................................ 84/609; 84/477 R

(58) Field of Classification Search .................... 84/609, 84/477 R

See application file for complete search history.

(56) References Cited

U.S. PATENT DOCUMENTS

| | | | | |
|---|---|---|---|---|
| 4,056,805 | A | 11/1977 | Brady | |
| 4,241,295 | A | 12/1980 | Williams, Jr. | |
| 4,797,795 | A | 1/1989 | Callahan | |
| 5,728,960 | A | 3/1998 | Sitrick | |
| 6,417,439 | B2 | 7/2002 | Uehara et al. | |
| 6,740,802 | B1 * | 5/2004 | Browne, Jr. | 84/609 |
| 7,045,698 | B2 | 5/2006 | Miyamoto | |
| 7,129,405 | B2 * | 10/2006 | Moffatt et al. | 84/600 |
| 7,242,152 | B2 | 7/2007 | Dowling et al. | |
| 2006/0185502 | A1 | 8/2006 | Nishitani et al. | |
| 2006/0291212 | A1 | 12/2006 | Forsman et al. | |
| 2008/0011149 | A1 | 1/2008 | Eastwood et al. | |
| 2008/0307946 | A1 * | 12/2008 | Machell | 84/477 R |
| 2009/0167483 | A1 * | 7/2009 | Jones et al. | 340/3.7 |

* cited by examiner

*Primary Examiner* — Jianchun Qin

(74) *Attorney, Agent, or Firm* — Booth Udall, PC

(57) ABSTRACT

A control interface for a visual presentation system. Implementations include a graphical interface including a plurality of parallel lines and plurality of spaces between and adjacent to the plurality of lines that define at least one visual staff. One or more visual notes may be disposed on the at least one visual staff. An output data stream may be included that includes a control sequence of one or more visual element parameters adapted to operate a visual presentation system and corresponding with the one or more visual notes. The output data stream may be coupled with a visual presentation system. One or more music notes on one or more music staffs may be included on the graphical interface adjacent to the at least one visual staff where the one or more music notes are correlated with the one or more visual notes on the at least one visual staff.

24 Claims, 10 Drawing Sheets

VISUAL PRESENTATION SYSTEM AND RELATED METHODS

COPYRIGHT NOTICE/PERMISSION

A portion of the disclosure of this document contains material which is subject to copyright protection. The copyright owner has no objection to the reproduction by anyone of the patent document or the patent disclosure as it appears in the U.S. Patent and Trademark Office patent file or records, but otherwise reserves all copyright rights whatsoever. The following notice applies to the drawings hereto and software described and disclosed herein. Copyright© 2009, Retinal 3-D, LLC., All Rights Reserved.

BACKGROUND

1. Technical Field

Aspects of this document relate generally to systems and methods for controlling visual and audio effects, such as lights, music, or visual displays, which may be accomplished using multiple data streams.

2. Background Art

Conventional multimedia presentations include audio and visual information presented on a display screen or by live performers. A wide variety of different entertainment genres may be included in a multimedia presentation, including random noises and sounds, various musical styles (rock, country, classical, etc.), visual images (lights, graphics, animation, etc.), and/or dramatic works (theater, motion picture, mime, etc.), and other special effects (fog machines, pyrotechnics, etc.). In conventional multimedia presentations, audio is often used to accompany visual elements included in the presentation. In the early days of motion pictures, the coordination of the audio with the visual elements took place manually, as a musician playing a piano using sheet music kept up with the changing pictures on the screen. Some more modern conventional multimedia presentations utilize timecodes developed by the Society of Motion Picture and Television Engineers (SMPTE) to enable synchronization of music with visual images. Some conventional systems like Musical Instrument Digital Interface (MIDI) Show Control (MSC) involve the transmission of programmed MIDI formatted messages at preset time intervals to cue MIDI interfaced compatible theater light and sound components during a performance.

SUMMARY

Implementations of a control interface for a visual presentation system may include a graphical interface coupled with a computer processor. The graphical interface may include a plurality of parallel lines and plurality of spaces between and adjacent to the plurality of lines where the plurality of parallel lines and the plurality of spaces define at least one visual staff. One or more visual notes may be disposed on the at least one visual staff on the plurality of parallel lines or within the plurality of spaces. An output data stream may be included that includes a control sequence of one or more visual element parameters adapted to operate a visual presentation system, where the control sequence corresponds with the one or more visual notes. The output data stream may be coupled with a visual presentation system. One or more music notes on one or more music staffs may be included on the graphical interface adjacent to the at least one visual staff where the one or more music notes are correlated with the one or more visual notes on the at least one visual staff.

Implementations of a control interface for a visual presentation system may include one, all, or any of the following:

The system may include one or more icons including a representation of a visual display of the visual presentation system on a presentation staff included on the graphical interface adjacent to the at least one visual staff. The representation may correspond with an appearance of the display of the visual presentation system and may have one or more frames.

A portion of the graphical interface may have a representation of the visual display of the visual presentation included, where the representation includes one or more frames included in a video image of the operation of one or more visual elements in the visual display of the visual presentation system. The one or more frames may be generated using the visual element parameters in the control sequence.

The visual display of the visual presentation system may include one or more light elements selected from the group consisting of neon tubes, incandescent lights, fluorescent tubes, sodium tubes, metal halide tubes, xenon tubes, and video images.

Implementations of visual presentation systems disclosed in this document may utilize implementations of a first method of generating a control sequence for a visual presentation system. The method may include arranging one or more visual notes on at least one visual staff included in a graphical interface on a display coupled with a computer processor. The graphical interface may be generated using the computer processor. The method may also include associating one or more visual element parameters with each of the one or more visual notes, generating a control sequence from the one or more visual element parameters where the control sequence is adapted to operate the visual presentation system, and including the control sequence in an output data stream coupled with the visual presentation system.

Implementations of a first method of generating a control sequence for a visual presentation system may include one, all, or any of the following:

The method may include formatting the output data stream in an extensible markup language (XML) format.

The method may include arranging one or more dynamic elements on the at least one visual staff adjacent to the one or more visual notes, where the dynamic elements are selected from the group consisting of staccato, crescendo, decrescendo, dynamic accent, fermata, trill, rest, slur, legato, glissando, ligature, tuplet, pianississimo, pianissimo, piano, mezzo piano, mezzo forte, forte, fortissimo, fortississismo, and sforzando.

The method may include associating one or more dynamic instructions in the one or more visual element parameters with each of the one or more dynamic elements and including the one or more dynamic instructions in the control sequence of the one or more visual element parameters.

The method may further include defining the intensity, chromaticity, gamma value, alpha channel, or brightness of a visual element of the visual presentation system using one or more of the one or more dynamic instructions in the control sequence.

Associating one or more visual element parameters with each of the one or more visual notes and generating a control sequence with the one or more visual element parameters may include associating one or more timing instructions in the one or more visual element parameters with each of the one or more visual notes and including the one or more timing instructions in the control sequence.

The method may include defining a display duration for a visual element in a visual display of the visual presentation system using the one or more timing instructions.

Generating a control sequence with the one or more visual element parameters may further include generating a Musical Instrument Digital Interface (MIDI) channel, a MIDI note on command, and a MIDI note off command for each of the one or more timing instructions and generating a corresponding DMX512-A universe channel value and an intensity value corresponding with the generated MIDI channel, MIDI note on command, and MIDI note off command. The method may further include including the generated DMX512-A universe channel value and the intensity value in the control sequence where the DMX512-A universe channel values correspond with a tube number associated with a light element in a light display of the visual presentation system. The light element may be selected from the group consisting of neon tubes, incandescent lights, metal halide tubes, fluorescent tubes, sodium tubes, and xenon tubes.

The method may include arranging a clef, key, and time signature on the at least one visual staff, defining one or more frequency bands within a range of frequencies corresponding with the clef and the key, defining one or more regions of the at least one visual staff each corresponding with one of the one or more frequency bands, and associating one or more visual notes with each of the one or more regions of the at least one visual staff.

Including the control sequence in an output data stream may further include including visual element parameters formatted in a Musical Instrument Digital Interface (MIDI), DMX512-A, MIDI Timecode (MTC), or a Society of Motion Picture and Television Engineers (SMPTE) standard.

Arranging one or more visual notes on at least one visual staff in the graphical interface on the display may further include forming one or more music notes on one or more music staffs from a music source using the computer processor and the graphical interface and arranging the one or more visual notes on the at least one visual staff on the graphical interface by correlating the music notes on the one or more music staffs with the one or more visual notes on the at least one visual staff using the computer processor.

The method may include arranging one or more icons including a representation of the visual presentation system on a presentation staff on the graphical interface, where the presentation staff is located adjacent to the at least one visual staff and the representation corresponds with an appearance of a visual display of the visual presentation system. The method may also include animating the representation with one or more frames generated by the computer processor by following a timing indicated by each of the one or more visual notes and by changing the color, intensity, chromaticity, gamma value, alpha channel, or brightness of a representation of a visual element in the visual display of the visual presentation system in each frame in response to encountering a position of each of the one or more visual notes on the at least one visual staff. The method may also include simultaneously playing music corresponding with one or more music notes included on the one or more music staffs included on the graphical interface where the one or more music notes are correlated with the one or more visual notes on the at least one visual staff included on the graphical interface. A timing of the music may be synchronized with the changes in the representation of the visual display of the visual presentation system included in the one or more icons on the presentation staff using the computer processor.

The method may further include providing haptic or tactile feedback to one or more viewers of the visual presentation using a haptic or tactile feedback system coupled with the output data stream.

Implementations of visual presentation systems may utilize implementations of a second method of generating a control sequence for a visual presentation system. The method may include receiving one or more inputs as notations of a graphical interface where the graphical interface is generated using a computer processor. The graphical interface may include a plurality of parallel lines and a plurality of spaces between and adjacent to the plurality of lines. The plurality of parallel lines and plurality of spaces may define at least one visual staff where at least one of the one or more notations is disposed on the at least one visual staff on the plurality of parallel lines or within the plurality of spaces forming at least one visual note. The method may also include associating one or more timing instructions in a set of visual element parameters with the at least one visual note, generating the control sequence from the one or more timing instructions, and including the control sequence in an output data stream coupled with the visual presentation system where the control sequence is adapted to operate the visual presentation system.

Implementations of a second method of generating a control sequence for a visual presentation system may include one, all, or any of the following:

The method may include associating one or more dynamic instructions with one or more dynamic elements included in the one or more notations where the one or more dynamic elements are associated with the at least one visual note. Generating the control sequence from the one or more timing instructions may further include including the one or more dynamic instructions in the control sequence in association with the one or more timing instructions associated with the at least one visual note.

The method may include defining at least one of the intensity, chromaticity, gamma value, alpha channel, or brightness of a visual element in a visual display of the visual presentation system using one or more of the one or more dynamic instructions in the control sequence and defining a display duration of the visual element in the visual display of the visual presentation system using the one or more timing instructions.

Generating a control sequence with the one or more timing instructions may further include generating a Musical Instrument Digital Interface (MIDI) channel, a MIDI note on command, and a MIDI note off command for each of the one or more timing instructions and generating a corresponding DMX512-A universe channel value and an intensity value corresponding with the generated MIDI channel, MIDI note on command, and MIDI note off command. The method may further include including the generated DMX512-A universe channel value and the intensity value in the control sequence where the DMX512-A universe channel values correspond with a tube number associated with a light element in a light display of the visual presentation system. The light element may be selected from the group consisting of neon tubes, incandescent lights, metal halide tubes, fluorescent tubes, sodium tubes, and xenon tubes.

Receiving the one or more inputs as notations on the graphical interface may further include forming one or more music notes on one or more music staffs from a music source using the computer processor and the graphical interface and arranging the one or more visual notes on the at least one visual staff on the graphical interface by correlating the music notes on the one or more music staffs with the one or more visual notes on the at least one visual staff using the computer processor. The method may also include arranging one or more icons including a representation of a visual display of the visual presentation system on a presentation staff on the graphical interface adjacent to the at least one visual staff where the representation corresponds with an appearance of the visual display of the visual presentation system. The method may also include animating the representation with one or more frames generated by the computer processor by following a timing indicated by each of the one or more visual notes and by changing the color, intensity, chromaticity, gamma value, alpha channel, or brightness of a representation of a visual element in the visual display of the visual presentation system in each frame in response to encountering a position of each of the one or more visual notes on the at least one visual staff.

The method may further include simultaneously playing music corresponding with one or more music notes on the one or more music staffs included on the graphical interface where the one or more music notes are correlated with the one or more visual notes on the at least one visual staff and wherein a timing of the music is synchronized with the changes in the representation of the visual display of the visual presentation system included in the one or more icons on the presentation staff using the computer processor.

The method may further include providing haptic or tactile feedback to one or more viewers of the visual presentation using a haptic or tactile feedback system coupled with the output data stream.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and.

DESCRIPTION

This disclosure, its aspects and implementations, are not limited to the specific components or assembly procedures disclosed herein. Many additional components and assembly procedures known in the art consistent with the intended visual presentation system and/or assembly procedures for a visual presentation system will become apparent for use with particular implementations from this disclosure. Accordingly, for example, although particular implementations are disclosed, such implementations and implementing components may comprise any shape, size, style, type, model, version, measurement, concentration, material, quantity, and/or the like as is known in the art for such visual presentation systems and implementing components, consistent with the intended operation.

Figure 1A:
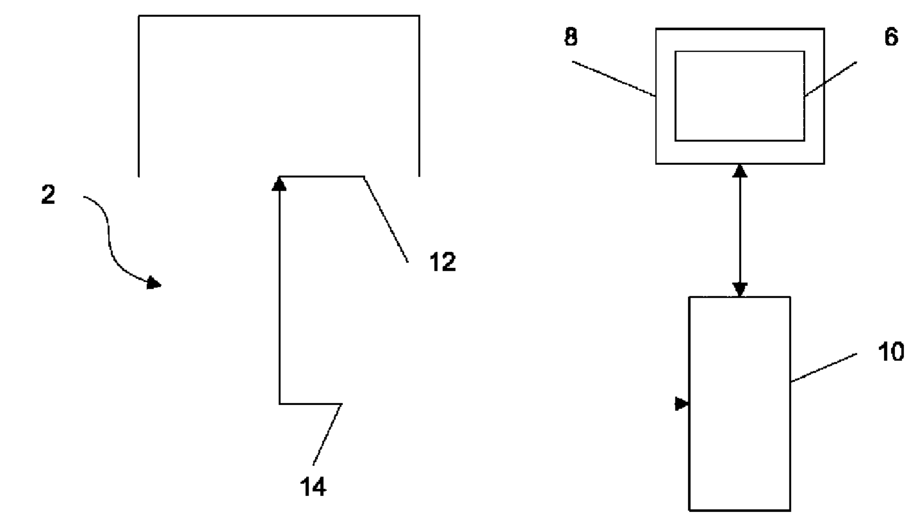
FIG. 1A is a block diagram of a first implementation of a visual presentation system with a display.
Figure 1B:
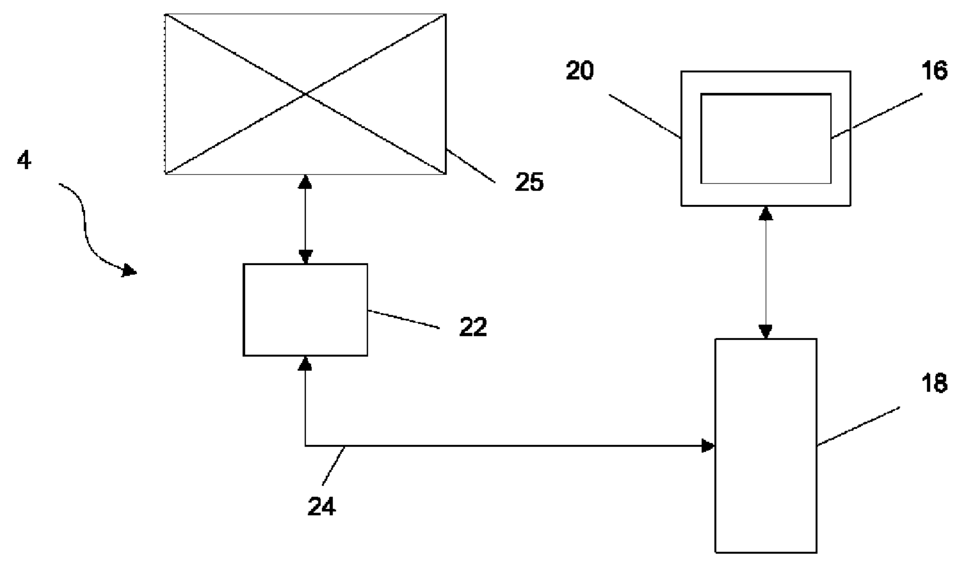
FIG. 1B is a block diagram of a second implementation of a visual presentation system with a light display.

Implementations of visual presentation systems may include any of a wide variety of components. Referring to FIGS. 1A and 1B, a block diagram of two implementations of visual presentation systems 2, 4 are illustrated. As illustrated in FIG. 1A, implementations of visual presentation systems may include a graphical interface 6 generated by a computer processor included in computer 10 that is coupled with a display 8 on which the graphical interface 6 is visible to a user. Computer 10 may be one or more client computers, servers, databases, or any combination of client computers, servers, or databases, the computer 10 running appropriate software so that the computer can operate to perform the functions needed for particular implementations disclosed herein. Computer 10 is coupled with light display 12, which is configured to receive output data stream 14 from computer 10 along with any feedback information from light display 12 that may be desired. Output data stream 14 contains a control sequence that includes various visual element parameters configured to operate, or control the operation of, one or more visual elements included in the light display 12. The visual elements may be portions of an image or video file being shown on the light display 12, or physical components of the light display 12, such as, by non-limiting example, lights, light-emitting diodes (LEDs), solid state lighting (SSL) devices, neon tubes, or other physical light-emitting or controlling components.

In the implementation of a visual presentation system 2 shown in FIG. 1A, the light display 12 may be a screen of any of a wide variety of types, such as, by non-limiting example, plasma screens, projection displays, digital light processing (DLP) projection systems, cathode ray tube (CRT) monitors, liquid crystal displays (LCDs), or any other screen display type. In addition, a wide variety of other pieces of equipment may receive some or all of the information contained in the control sequence included in the output data stream 14 and use the information to determine when to activate and/or what effects to provide. Examples of equipment that could also be coupled with the output data stream 14, and for which corresponding graphical interfaces comprising visual staffs and visual notes may be configured to generate automatic control signals, include, by non-limiting example, fog machines, stage lights, speakers, television displays, strobe lights, turntables, laser displays, pyrotechnics, holograms, radios, cellular telephones, house lighting systems, stage props, cuing devices for actors, and many other components and systems capable of receiving automatic control signals. In particular implementations, the information in the control sequence may be received by a haptic or tactile feedback system to allow viewers additional feedback while viewing the visual presentation. These implementations may enable those who are hearing impaired to analogously experience the musical portion of the presentation while observing the visual portion.

Referring to FIG. 1B, a second implementation of a visual display system 4 is illustrated. The visual display system 4 includes a graphical interface 16 generated by a processor included in computer 18 and visible to a user on display 20. Computer 18 may be one or more client computers, servers, databases, or any combination of client computers, servers, or databases. Computer 18 is coupled with an electronic power supply controller 22 through output data stream 24. Electronic power supply controller 22 may be configured to receive a control sequence containing visual element parameters included in the output data stream 24 and use the visual element parameters directly to control the operation of any of a plurality of electronic power supplies coupled with the electronic power supply controller 22. In other implementations, the electronic power supply controller 22 may process the received visual element parameters and generate a set of derived control parameters needed to produce a visual effect indicated by one or more of the visual element parameters with one or more specific visual elements included in light display 25. In particular implementations, the derived control parameters may be pulse width modulation (PWM) with dynamic frequency control (DFC) formatted instructions adapted to control the operation of an electronic power supply (EPS) coupled with the visual elements. Sets of derived control parameters may be used particularly in implementations of light displays 25 that utilize tube lighting sources, such as, by non-limiting example, neon tubes, xenon tubes, metal halide tubes, fluorescent tubes, sodium tubes, SSL devices, organic light emitting diodes (OLEDs) fiber optic devices, or any other lighting source and/or visual display. As was previously discussed with the implementation of a visual display system 2 illustrated in FIG. 1A, any of a wide variety of other types of equipment could also be coupled with the output data stream 14 and operated through information included in the output data stream 14.

Implementations of output data streams 14 disclosed in this document may include control sequences that contain data (dynamic instructions and/or timing instructions) formatted in any of a wide variety of formats and may include information transmitted from the computer 10, 18 in real time, subject to one or more delays, or retrieved from a data file or from one or more databases associated with computer 10, 18. When the information included in the control sequence in the output data stream 14, 24 is from a data file or from one or more databases associated with computer 10, 18, the information may be formatted in extensible markup language (XML) format, or in any other computer-readable data format usable for conveying the information. In other implementations, the information included in the output data stream, including various visual element parameters may be formatted in a wide variety of data formats, including, by non-limiting example, Musical Instrument Digital Interface (MIDI), MIDI Time Code (MTC), or Society of Motion Picture and Television Engineers (SMPTE), Ethernet, Motion Picture Experts Group (MPEG), serial, Recommended Standard (RS)-232, RS-422, Electronic Industries Alliance (EIA)-485 (RS-485), Wireless Fidelity (WiFi®), radio common carrier (RCC) protocols, and any other packetized, serial, parallel, synchronous, or asynchronous data transport method.

Figure 2:
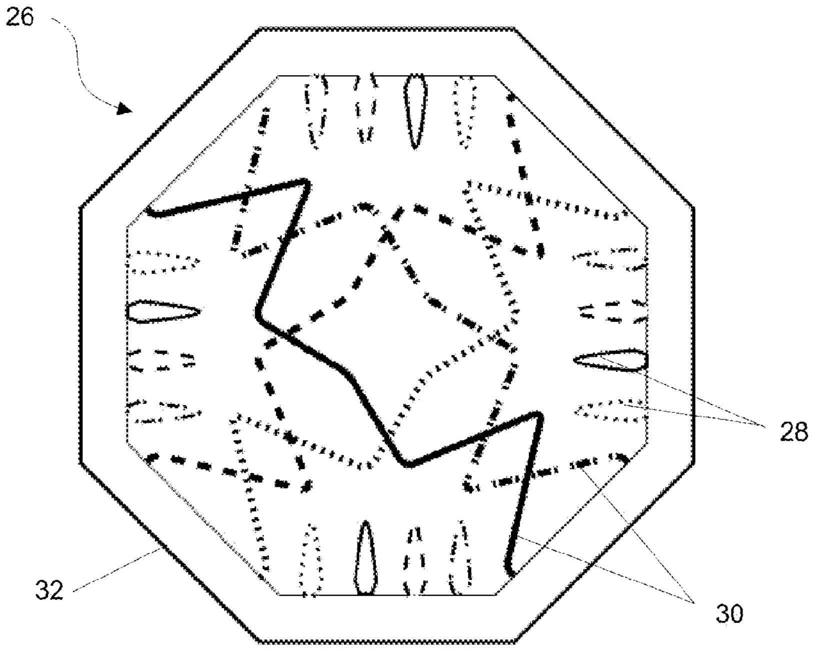
FIG. 2 is a front view of an implementation of a light display of an implementation of a visual presentation system including a plurality of incandescent lights and neon tubes.

Referring to FIG. 2, a front view of an implementation of a light display 26 of a visual display system implementation is illustrated. The light display 26 includes a plurality of incandescent light sources 28 and a plurality of neon tubes 30 arranged within an octagonal casing 32. As illustrated by the different line patterns, the particular color of light emitted by each of the plurality of incandescent light sources 28 and plurality of neon tubes 30 may differ from light to light and tube to tube in particular implementations. Each of the plurality of incandescent light sources 28 and the plurality of neon tubes 30 may be independently connected to power through an electronic power supply controller that regulates the flow of power from a plurality of electronic power supplies. In particular implementations, the electronic power supply controller may receive various visual element parameters included in a control sequence in an output data stream to which the electronic power supply controller is coupled and process them to generate a set of derived control parameters needed to produce a visual effect indicated by one or more of the visual element parameters with one or more of the specific visual elements (incandescent lights 28 and/or neon tubes 30). In other implementations, the control sequence and/or the visual element parameters themselves may be sufficient for the electronic power supply controller to produce the desired visual effect with one or more of the visual elements in the light display 26.

Figure 3:
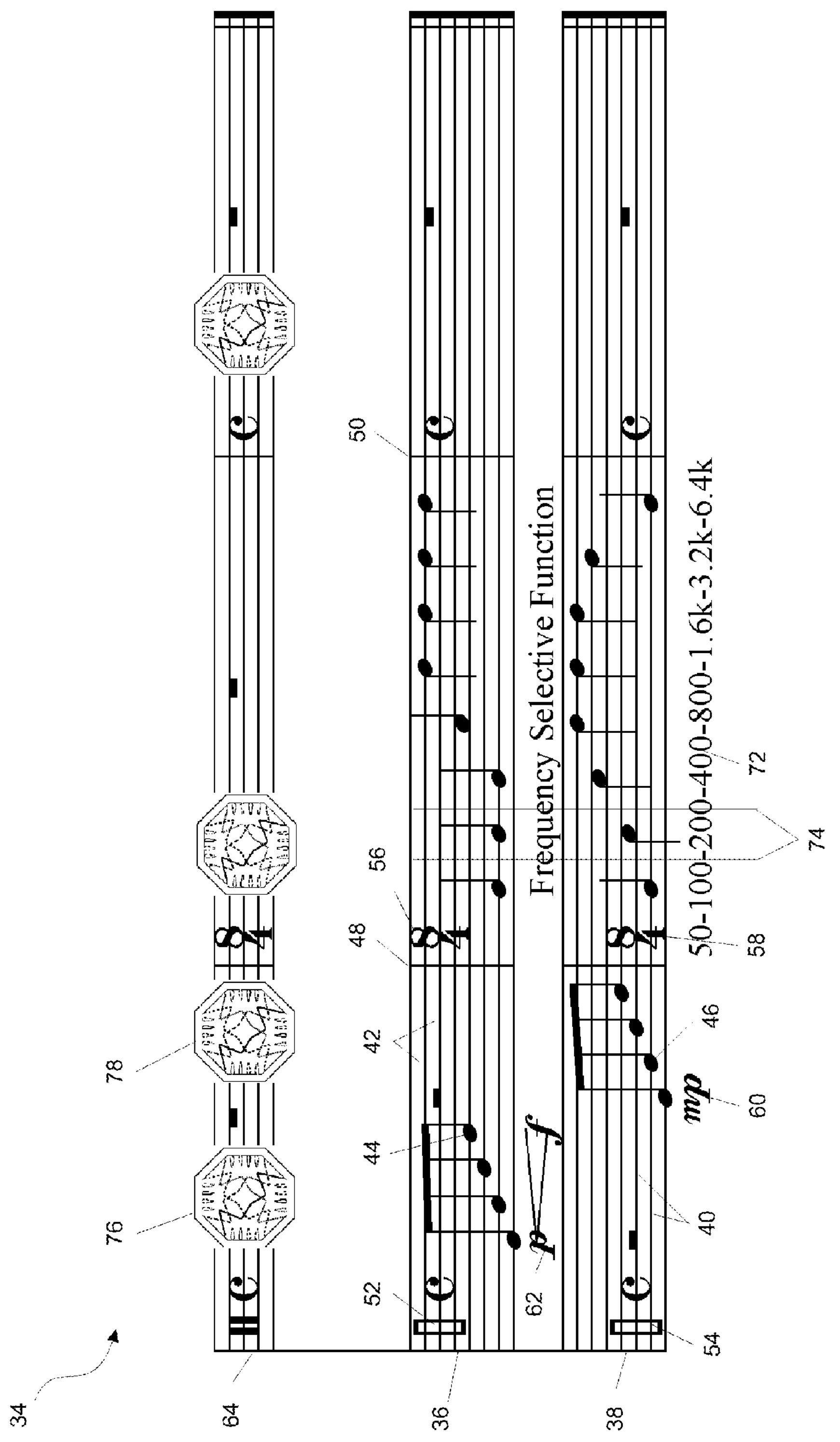
FIG. 3 is a front view of an implementation of a graphical interface with implementations of a presentation staff and a visual staff.

Referring to FIG. 3, an implementation of a graphical interface 34 is illustrated. The graphical interface 34 may include visual staffs 36, 38 that comprise a plurality of parallel lines 40 with a plurality of spaces 42 between and adjacent to the plurality of parallel lines 40. Each of the plurality of lines 40 and plurality of spaces 42 may correspond with a particular visual element in a display of a visual presentation system. Visual notes 44, 46 are placed on the staff either on one of the plurality of lines 40 or within one of the plurality of spaces 42. Visual notes 44, 46 may be added by a user of the visual presentation system by interacting with the graphical interface 34 through a variety of methods, including, by non-limiting example, a mouse, a palette of selectable visual notes, a finger touch, a stylus, or any other human-computer interface device or system. Visual notes 44, 46 may be input as notations on the graphical interface 34 in various implementations. In implementations of graphical interfaces 44, visual notes 44, 46 may take the form of conventional musical notes and conform to conventional musical notation; in other implementations, visual notes 44, 46 may utilize a specialized or custom notation and/or font to enable them to be distinguishable from conventional musical notes in other locations on the graphical interface 34. The visual staffs 36, 38 are divided into discrete time intervals (measures) through bar lines 48, 50. Also as shown, the visual staffs 36, 38 may be assigned to various clefs through clefs 52, 54 and the key of each of the visual staffs 36, 38 may be indicated through the use of conventional musical notation by adding various sharp and flat symbols to the proper lines 40 or spaces 42 to produce the desired key. In addition, the time signature for each of the various measures may be indicated through the use of time signatures 56, 58.

Dynamic elements 60, 62 may also be included adjacent to visual notes 44, 46. These dynamic elements 60, 62 may be any of a wide variety of conventional dynamic notations used in music, such as, by non-limiting example, staccato, crescendo, decrescendo, dynamic accent, fermata, trill, rest, slur, legato, glissando, ligature, tuplet, pianississimo, pianissimo, piano, mezzo piano, mezzo forte, forte, fortissimo, fortississimo, and sforzando, and any other notation useful for indicating the volume, sequencing, approach, or execution of a particular visual note or group of visual notes.

While two visual staffs 36, 38 are illustrated in FIG. 3, any number of additional visual staffs may be included in particular implementations. As illustrated and in relation to a particular implementation, within particular measures, as indicated by bar lines 48, 50, one or more frequency bands 72 may be defined within a range of frequencies that correspond with the clef and key indicated on the visual staffs 36, 38. These frequency bands 72 may be used to define regions 74 (the areas between the lines between the bar lines 48, 50) within each of the visual staffs 36, 38 that are used to associate visual notes within those regions 74 with a specific frequency band 72. In operation, particular visual elements may be assigned to each region 74 of the specific frequency band 72, and may be activated as the notes within the region 74 are encountered while following the timing sequence defined by the notes. In particular implementations, because the notes may be assigned to a specific region 74, the assigned visual element will be played when those notes are encountered no matter what the position of the visual notes within the region 74 would ordinarily indicate. In other implementations, the position of the notes on the lines and spaces of the staff may be used in combination with the region information to determine which specific visual elements should be activated.

Referring to FIG. 3, a presentation staff 64 is included adjacent to the visual staffs 36, 38. Presentation staff 64 includes icons 76, 78 that contain a representation of the visual presentation system and/or of the light display of the visual presentation system. In the implementation illustrated in FIG. 3, the representation is of the light display 26 illustrated in FIG. 2. The icons 76, 78 may contain representations that change appearance to conform with what the light display of the visual presentation system would look like when the visual notes on one or all of the visual staffs 36, 38 in the same discrete time interval (or measure) have been implemented or are being implemented. In particular implementations, an icon may be included in the presentation staff for each measure indicated by bar lines; in other implementations, a single icon may be included per line of presentation staff that changes the representation of the display of the visual presentation system through the use of one or more frames generated by the computer processor that follow the timing indicated by the visual notes and correspond with the appearance of the physical display when the visual notes are implemented or after they have been implemented.

Figure 4:
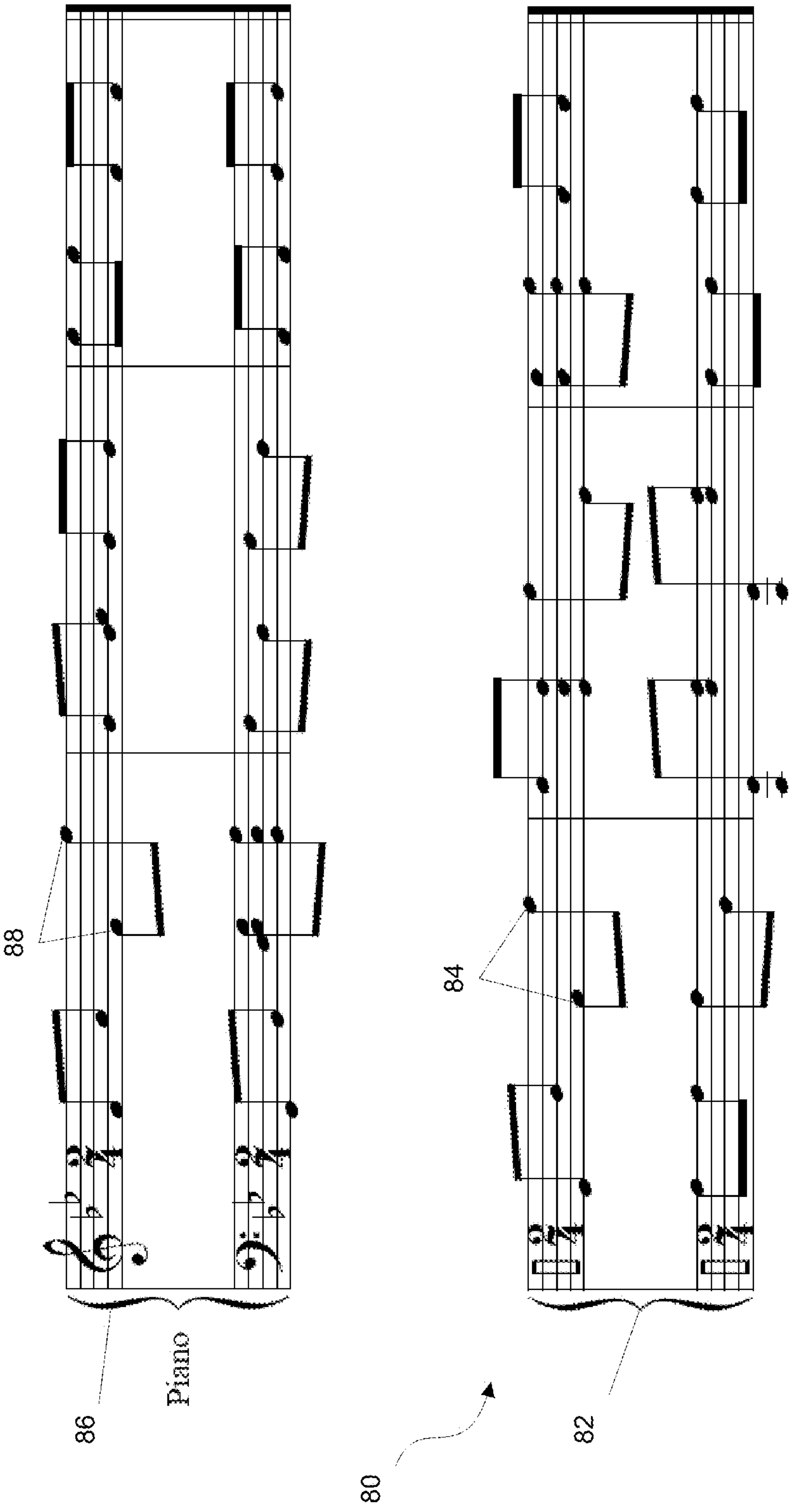
FIG. 4 is a front view of an implementation of a graphical interface with implementations of a music staff and a visual staff.

Referring to FIG. 4, another implementation of a graphical display 80 is illustrated. A visual staff 82 is illustrated with visual notes 84 placed on it along with a music staff 86 adjacent to the visual staff 82 which includes music notes 88. The music notes 88 and the visual notes 84 are correlated with each other. In particular implementations, music notes 88 and visual notes 84 may be correlated with each other in a one-to-one relationship; in other words, each music note 88 has a correlated visual note 84 on the visual staff 82. In other implementations, and as illustrated in FIG. 4, more than one or less than one visual note 84 may be correlated with each music note 88. In all implementations, however, the timing of the visual staff 82 and the music staff 86 is synchronized by the bar line notations that show the duration of the measures on the visual staff 82 and the music staff 86. Because the bar lines are the basic unit of time on the linear time scales used in implementations of the invention, the music notes 88 and visual notes 84 are time synchronized using what may be referred to as a flat timeline. As a result, the visual notes 84 and music notes 88 on the visual staff 82 and music staff 86, respectively, are time synchronized with each other. Any of a wide variety of automated algorithms or human-guided choices may be used to determine the exact position of the visual notes 84 to correlate the visual notes 84 with the music notes 88 to create a desired synchronized visual effect as the music notes 88 are played. In this way, implementations of visual presentation systems may present visual presentations synchronized with audibly played music through the correlated visual notes 84 and music notes 88.

The music notes 88 may be added to music staff 86 manually, through interaction of the user with the graphical interface, as may the visual notes 84 on the visual staff 82. Particular implementations may enable adding of the music notes 88, visual notes 84, music staff 86 and visual staff 82 through a graphical interface created by a wide variety of music software composing programs, such as Finale® or Canorus. In these programs, the music notes 88, visual notes 84, music staff 86, and visual staff 82 may be selected from various selectable palettes or settings files from within the music software composing program. In such implementations, a software plugin may be used to insert particularly the palettes or settings files for the visual notes 84 and the visual staff 82, while the music notes 88 and music staff 86 may be already accessible. When composing either music and/or a visual presentation, a user may utilize the graphical interface created by the music software composing program to manually select the music notes 88 and/or visual notes 84. When composing takes place through manual operation, the user may select any desired correlation between the music notes 88 and the visual notes 84 without the use of any automatic selection or recommendation in some implementations. In others, particular combinations of music notes 88 and visual notes 84 may be suggested by the computer processor via the plugin and/or music software composing program. A wide variety of manual or automatic composing options and processes may be implemented to enable a user to synchronize music in the form of notes with the operation of a light display of a visual presentation system via visual notes and a visual staff.

In various implementations, the music notes 88 may be obtained from a music source, which may be, by non-limiting example, physical sheet music scanned in and recognized through an optical character recognition (OCR) process, music composed in any of a wide variety of conventional music software packages such as Finale®, Canorus, or Rosegarden, music generated via scoring using various conventional methods of converting existing audio files to sheet music, or any other method or system for inputting musical notes 88 on the music staff 86 on the graphical interface 80. Because the music source may be a live audio source in particular implementations, when automatic correlation between the generated music notes 88 and the visual notes 84 is used, implementations of light displays included in implementations of visual presentation systems may be able to present a visual presentation in synchronization with music from a live, and not previously recorded, audio performance. In other implementations, real-time correlation may be used to present a visual presentation created in real-time in synchronization with any pre-recorded audio source using programmed performance parameters or algorithmically derived composing options.

Figure 5:
FIG. 5 is a front view of an implementation of a display of an implementation of a visual presentation system including a video file.

In particular implementations, the light display associated with an implementation of a visual presentation system (particularly those utilizing screens) may show a video file or image that changes appearance in synchronization with an audio source or in response to the playing of visual notes on a visual staff. Referring to FIG. 5, an implementation of a video file or image 90 is illustrated. Portions 92, 94 may be correlated with a particular visual note or group of visual notes in particular implementations. As the visual notes are progressively reached in time sequence, various effects may be displayed in the locations 92, 94 of the video file or image 90, including, by non-limiting example, changes in: color, blinking, cross-hatching, glowing, gradient type or position, intensity, chromaticity, gamma value, alpha channel, brightness, rapidity, duration, hue, saturation, red green blue (RGB) coloring, cyan magenta yellow key (CMYK) coloring, vector positioning, vector displacement, or any other visually perceptible characteristic. To aid in the effects, changes may be made in one or many frames associated with the video file or image 90 in response to encountering the position of one or many of the visual notes on a visual staff. In particular implementations, the video file or image may be of a simulated or video recorded light display like those disclosed in this document that utilize various light sources and whose visual elements are being activated in correspondence with the visual notes on a visual staff on the graphical interface. The video file or image 90 may be any of a wide variety of video file format types or image format types, including, by non-limiting example, MPEG, animated .png, animated .gif, Windows® Media Player, Real® Player, or any other video or image file format or type adapted to sequentially display frames or moving images.

Figure 6:
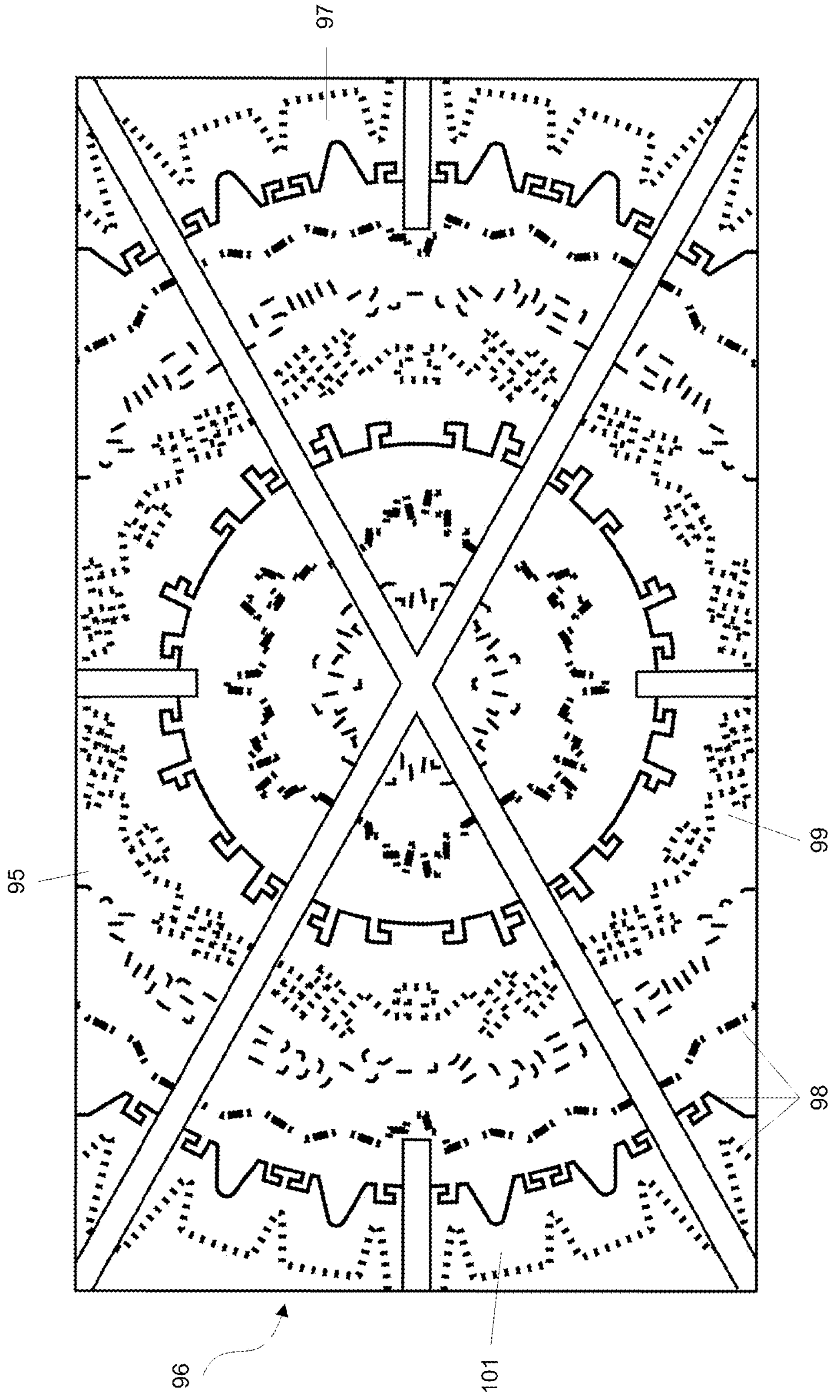
FIG. 6 is a front view of another implementation of a light display of an implementation of a visual presentation system including a plurality of neon tubes and fluorescent tubes.
Figure 7:
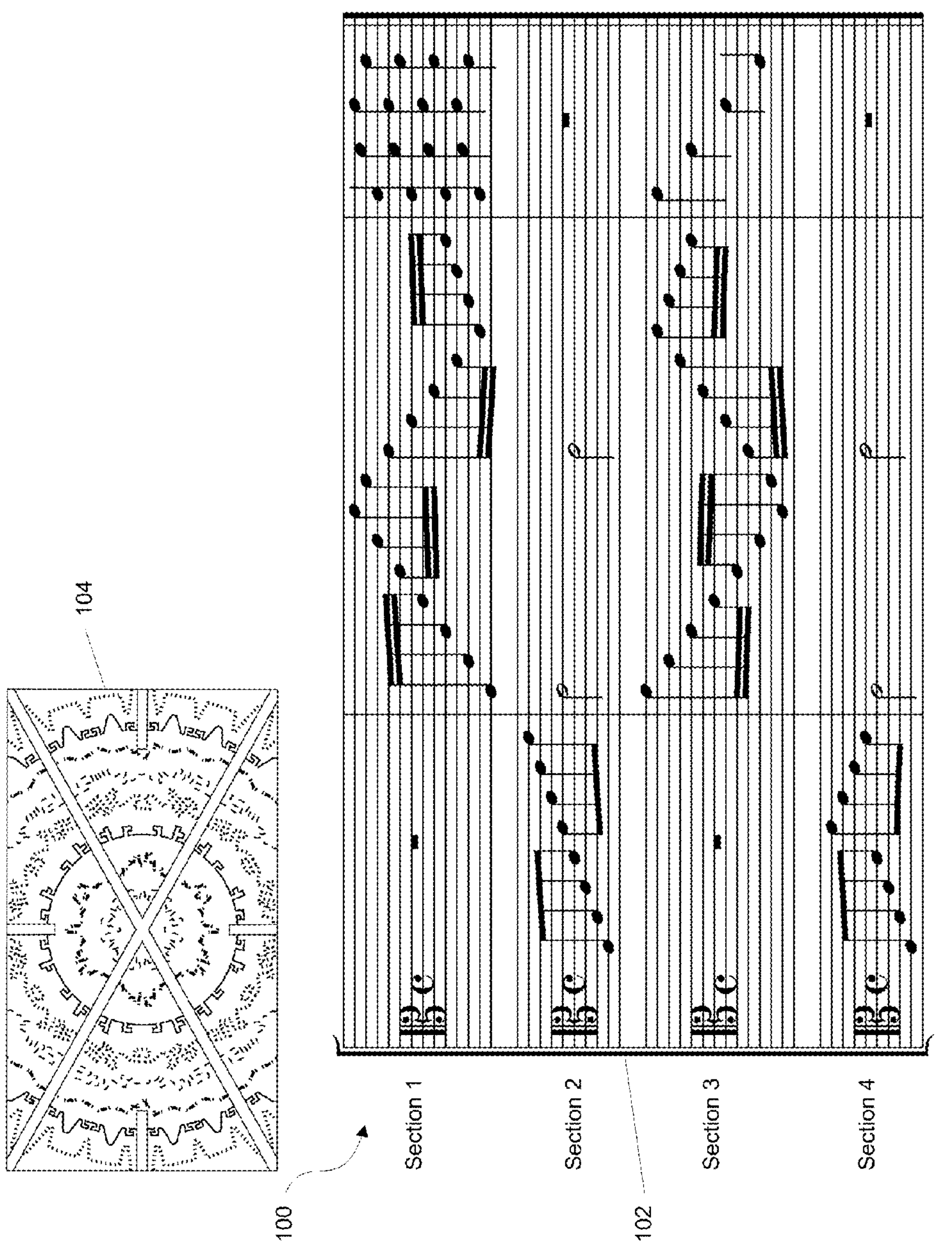
FIG. 7 is a front view of an implementation of a graphical interface with an implementation of a visual staff and of an icon with a representation of the visual presentation system illustrated in FIG. 6.

Referring to FIG. 6, a front view of another implementation of a light display 96 is shown. The light display 96 includes a plurality of tubes 98 which may include, by non-limiting example, neon tubes, xenon tubes, metal halide tubes, sodium tubes, fluorescent tubes, and any other tube light source. However, in particular implementations, any other light generating source may be used. As illustrated by the different line patterns, the tubes may each emit light in a color different from colors emitted by other tubes. Each of the tubes (or light sources) may be associated with a unique tube number (or unique number), which may be assigned a channel value in a DMX512-A universe or an equivalent value in another addressing system, such as the ArtNet protocol addressing system. Referring to FIG. 7, an implementation of a graphical interface 100 is shown that includes a visual staff 102 and a representation 104 of the light display 96 illustrated in FIG. 6. The representation 104 occupies a portion of the graphical interface and differs from the icons previously disclosed in that it may remain in the location it occupies and not be on a presentation staff. The representation 104 may be a location on the graphical interface where a video file (such an MPEG, or other file type) or animated image (such as an animated .png or .gif, or other file type) is visible when the sequence of the visual notes on the visual staff 102 is followed from a starting point to an ending point. The representation 104 may utilize one or more frames which may be generated by the processor in the computer associated with the visual presentation system from changes in the visual elements being displayed in the light display 96, based on visual element parameters associated with each of the visual notes.

Portions of the visual staff 102 may be associated with sections of the tubes 95, 97, 99, 101 on the light display 96. In the implementation illustrated in FIG. 7, four sets of lines and spaces form four corresponding sections of the visual staff 102. Each line and space in the visual staff 102 may correspond to a specific tube in the light display 96 in particular implementations. In order to activate or provide a visual effect with the tube corresponding to the location of each visual note on the visual staff 102, one or more visual element parameters may be associated with each visual note. In particular implementations, each visual note may be associated with one or more timing instructions in the set of one or more visual element parameters associated with the visual staff 102. For example, a visual note with a notation equivalent to the musical quarter note may have a timing instruction with a corresponding durational value associated with it, depending upon the tempo assigned to the visual staff 102. In addition, where dynamic elements are present adjacent to one or more visual notes, one or more dynamic instructions may be associated with the set of visual element parameters associated with the visual staff 102. As illustrated in FIG. 7, where a number of notes are sequentially arranged in ascending and descending order on the visual staff 102, a visual "roll" effect may be indicated that is executed by sequentially activating the tubes corresponding to the notes (which can visually create a clockwise and counterclockwise rotation effect on the light display 96). Where the visual notes are arranged in a chord on the visual staff 102, the tubes corresponding to the notes may be activated simultaneously in particular implementations. A control sequence can be constructed using the set of visual element parameters associated with the visual staff 102, because the visual element parameters include all of the required timing instructions and dynamic instructions necessary to translate the sequence of visual notes into a time-synchronized progression of activations of visual elements of the light display 96.

The control sequence may be constructed by generating a sequence with the one or more timing instructions and with the dynamic instructions; in particular implementations, all of the timing instructions may be assembled in a time progression ordered fashion, followed by all of the associated dynamic instructions linked to the timing instructions via bar line references or other reference values. In other implementations, each timing instructions may be associated with a corresponding dynamic instruction in the control sequence. While the timing instructions may be used to indicate which visual element in a display should be activated, the dynamic instructions may be used to produce any of a wide variety of effects with a particular one or group of visual elements, such as, by non-limiting example, defining the intensity, chromaticity, gamma value, alpha channel, or brightness or any other visually discernable parameter. The particular format of the control sequence when included in the output data stream may be any disclosed in this document. Any of a wide variety of possibilities for forming control sequences using visual element parameters disclosed in this document are possible using the principles disclosed in this document. A fragment of a control sequence formatted in an XML data format corresponding to the first measure of the visual staff 38 illustrated in FIG. 3 is included below:

```
<part id="P3">
  <measure number="1">
  <attributes>
    <divisions>8</divisions>
    <key>
      <fifths>0</fifths>
      <mode>major</mode>
    </key>
    <time symbol="common">
      <beats>4</beats>
      <beat-type>4</beat-type>
    </time>
    <clef>
      <sign>percussion</sign>
    </clef>
    <staff-details>
      <staff-lines>8</staff-lines>
    </staff-details>
  </attributes>
  <sound tempo="120"/>
  <note>
    <rest/>
    <duration>16</duration>
    <voice>1</voice>
```

```
    <type>half</type>
  </note>
  <direction placement="below">
    <direction-type>
      <dynamics default-y="-64">
        <mp/>
      </dynamics>
    </direction-type>
    <offset>1</offset>
    <sound dynamics="69"/>
  </direction>
  <note>
    <pitch>
      <step>E</step>
      <octave>4</octave>
    </pitch>
    <duration>4</duration>
    <voice>1</voice>
    <type>eighth</type>
    <stem>up</stem>
    <beam number="1">begin</beam>
  </note>
  <note>
    <pitch>
      <step>G</step>
      <octave>4</octave>
    </pitch>
    <duration>4</duration>
    <voice>1</voice>
    <type>eighth</type>
    <stem>up</stem>
    <beam number="1">continue</beam>
  </note>
  <note>
    <pitch>
      <step>B</step>
      <octave>4</octave>
    </pitch>
    <duration>4</duration>
    <voice>1</voice>
    <type>eighth</type>
    <stem>up</stem>
    <beam number="1">continue</beam>
  </note>
  <note>
    <pitch>
      <step>D</step>
      <octave>5</octave>
    </pitch>
    <duration>4</duration>
    <voice>1</voice>
    <type>eighth</type>
    <stem>up</stem>
    <beam number="1">end</beam>
  </note>
  </measure>
```

For the exemplary purposes of this disclosure, in the implementation of a light display 96 illustrated in FIG. 6, the processor in the computer associated with the light display 96 may take the position of each visual note and generate a corresponding Musical Instrument Digital Interface (MIDI) channel, MIDI note on command, and MIDI note off command for the timing instruction (and/or visual element parameter) associated with each of the visual notes and add the channel and note on commands to a control sequence. Also, the processor may include the DMX512-A universe channel values associated with each visual element (by tube number, which may be a unique number in particular implementations) associated with the particular line and space on which each visual note is located with the corresponding timing instructions in the control sequence. An corresponding intensity value may also be generated based on the information in the MIDI note on command and the MIDI note off command for the visual element associated with the particular DMX512-A universe channel value. Because in particular implementations, since the data rate of a DMX512-A universe channel may be higher than the data rate of a MIDI channel, the end of a measure may be indicated by including an all-off packet in the control sequence. Additional values may be included in the control sequence that correspond with various MIDI dynamic commands corresponding with one or more dynamic elements associated with each visual note. The resulting control sequence identifies which visual element or tube should be activated and for how long. The addition of dynamic instructions indicates to the electronic power supply controller or display what other effects should be implemented when the particular tube or visual element is activated.

Figure 8:
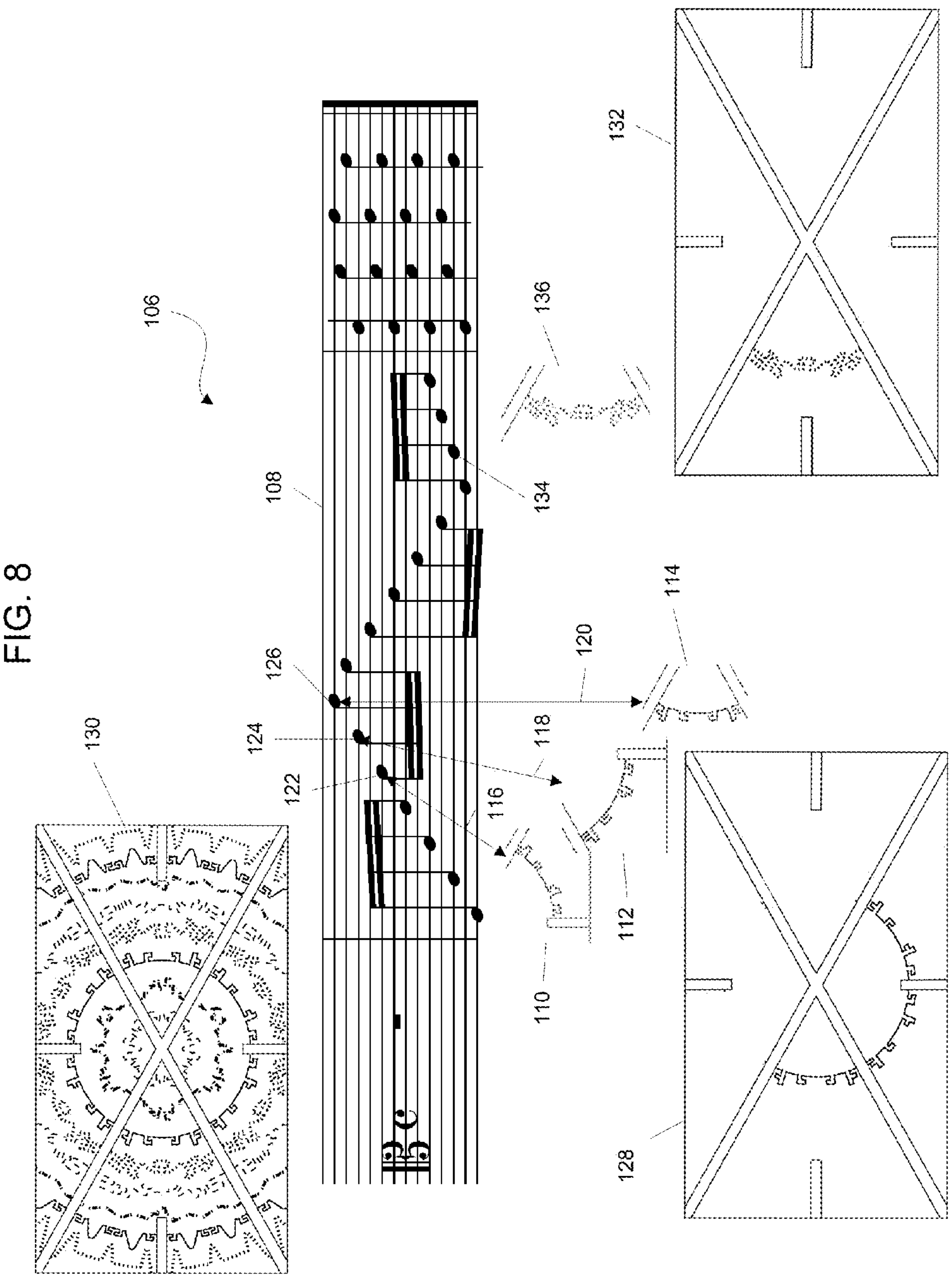
FIG. 8 is a front view of an implementation of a graphical interface with an implementation of a visual staff showing the correlation between visual notes and frames used to animate the representation included in the icon illustrated in FIG. 6.

FIG. 8 illustrates a portion of an implementation of a graphical interface 106 that includes a visual staff 108 that corresponds with the portion of the visual staff 102 from FIG. 7. Below the staff are representations of visual elements 110, 112, 114 with indicator lines 116, 118, 120 connecting the visual elements 110, 112, 114 with visual notes 122, 124, 126 indicating the correlation between the location of the visual notes 122, 124, 126 on the visual staff 108 and the visual elements 110, 112, 114. Below the visual elements 110, 112, 114 is a frame indicator 128, illustrating how, in particular implementations, changes of a plurality of visual elements may be included in a single frame displayed in the representation 130. Frame indicator 132 also illustrates how, when the timing instruction indicated by the visual note 134 is of sufficient duration, a single frame may contain just the change in the single visual element 136 correlated with visual note 134. The implementation of a graphical interface 106 also illustrates how, in particular implementations, the particular visual elements may be displayed adjacent to their corresponding notes, to enable tracking of the changes from frame to frame within the representation or as an aid for the user in making the visual element assignments. These examples illustrate how changes in the representation 130 can be synchronized to the visual notes using frames. These examples also illustrate how, in implementations of visual presentation systems utilizing a light display containing a representation of an actual light display, frames can be used to handle and simulate changes in the representation as well. In particular implementations, the representations may be in any visual media that is capable of being time synchronized using the SMPTE or MTC standards or any other accepted industry timing standard.

Figure 9:
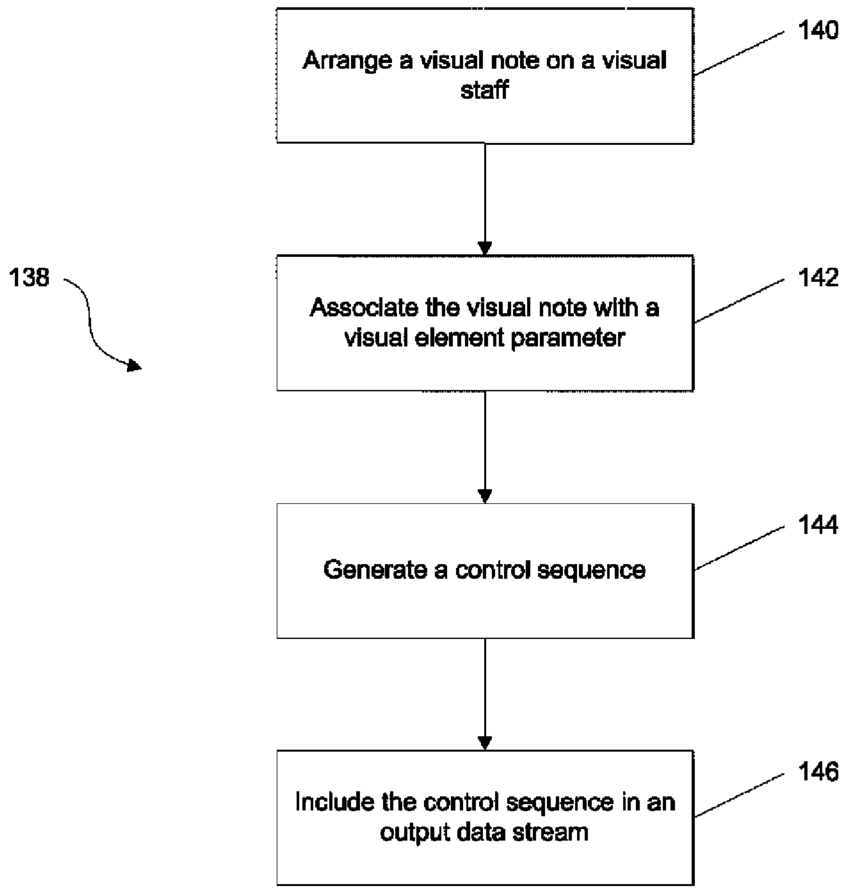
FIG. 9 is a flowchart of a first implementation of a method of generating a control sequence for a visual presentation system.

Referring to FIG. 9, an implementation of a first method of generating a control sequence for a visual presentation system 138 is illustrated. The method 138 includes arranging a visual note on a visual staff (step 140), associating the visual note with a visual element parameter (step 142), generating a control sequence (step 144), and including the control sequence in an output data stream (step 146). The various system components and additional method steps that may be included in implementations of the method 138 may be any disclosed in this document.

Figure 10:
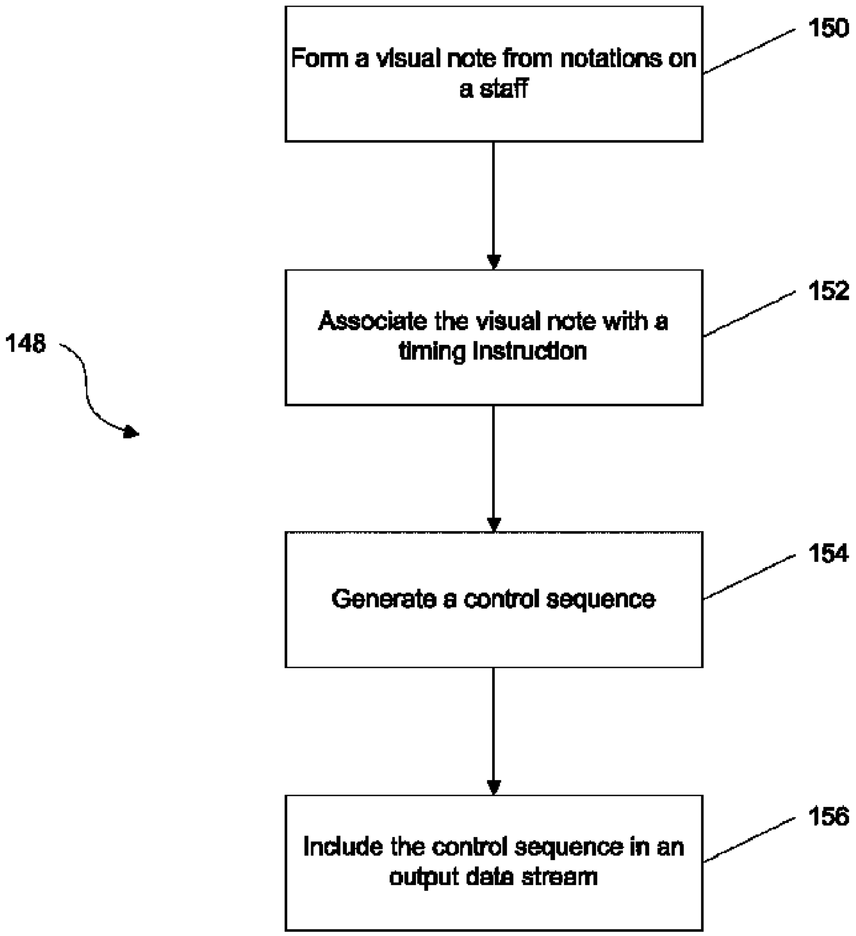
FIG. 10 is a flowchart of a second implementation of a method of generating a control sequence for a visual presentation system.

Referring to FIG. 10, an implementation of a second method of generating a control sequence for a visual presentation system 148 is illustrated. The method 148 includes forming a visual note from notations of a staff (step 150), associating the visual note with a timing instruction (step 152), generating a control sequence (step 154), and including the control sequence in an output data stream (step 156). As was indicated with the first method 138, any of the system components and method implementations included in this document may be utilized with implementations of the second method 148.

In places where the description above refers to particular implementations of visual presentation systems, it should be readily apparent that a number of modifications may be made without departing from the spirit thereof and that these implementations may be applied to other visual presentation systems.

The invention claimed is:

1. A method of generating a control sequence for a visual presentation system, the method comprising:

arranging one or more visual notes representing a visually perceived stimuli associated with at least one visual element of a visual presentation system, the one or more visual notes positioned on at least one visual staff included in a graphical interface on a display coupled with a computer processor, the graphical interface generated using the computer processor;

associating one or more visual element parameters with each of the one or more visual notes, the visual element parameters comprising at least one of color, intensity, chromaticity, gamma value, alpha channel, rapidity, duration, hue, saturation, red green blue coloring, cyan magenta yellow key coloring, vector positioning, vector displacement, and brightness;

generating a control sequence from the one or more visual notes on the at least one visual staff and a timing sequence indicated at least in part by relative positioning of the one or more visual notes on the at least one visual staff, the control sequence adapted to control operation of the visual presentation system;

including the control sequence in an output data stream coupled with the visual presentation system;

displaying a representation of the visual presentation system on the graphical interface adjacent to the at least one visual staff; and animating the representation with one or more frames generated by the computer processor by following a timing indicated by each of the one or more visual notes and by changing one of the color, intensity, chromaticity, gamma value, alpha channel, rapidity, duration, hue, saturation, red green blue coloring, cyan magenta yellow key coloring, vector positioning, vector displacement, and brightness of a representation of a visual element in the visual display of the visual presentation system in each frame in response to encountering a position of each of the one or more visual notes on the at least one visual staff.

2. The method of claim 1, further comprising formatting the output data stream in an extensible markup language (XML) format.

3. The method of claim 1, further comprising arranging one or more dynamic elements on the at least one visual staff adjacent to the one or more visual notes, wherein the one or more dynamic elements are selected from the group consisting of staccato, crescendo, decrescendo, dynamic accent, fermata, trill, rest, slur, legato, glissando, ligature, tuplet, pianississimo, pianissimo, piano, mezzo piano, mezzo forte, forte, fortissimo, fortississismo, and sforzando.

4. The method of claim 3, further comprising associating one or more dynamic instructions in the one or more visual element parameters with each of the one or more dynamic elements and including the one or more dynamic instructions in the control sequence of the one or more visual element parameters.

5. The method of claim 4, further comprising defining one of the intensity, chromaticity, gamma value, alpha channel, rapidity, duration, hue, saturation, red green blue coloring, cyan magenta yellow key coloring, vector positioning, vector displacement, and brightness of a visual element of the visual presentation system using one or more of the one or more dynamic instructions in the control sequence.

6. The method of claim 1, wherein associating one or more visual element parameters with each of the one or more visual notes and generating a control sequence with the one or more visual element parameters further comprises associating one or more timing instructions in the one or more visual element parameters with each of the one or more visual notes and including the one or more timing instructions in the control sequence.

7. The method of claim 6, further comprising defining a display duration for a visual element in a visual display of the visual presentation system using the one or more timing instructions.

8. The method of claim 7, wherein generating a control sequence with the one or more visual element parameters further comprises:

generating a Musical Instrument Digital Interface (MIDI) channel, MIDI note on command, and MIDI note off command for each of the one or more visual element parameters and generating a corresponding DMX512-A universe channel value and an intensity value corresponding with the generated MIDI channel, MIDI note on command, and MIDI note off command; and including the DMX512-A universe channel value and the intensity value in the control sequence, the DMX512-A universe channel value corresponding with a tube number associated with a light element in the visual display of the visual presentation system;

wherein the light element is selected from the group consisting of neon tubes, incandescent lights, metal halide tubes, fluorescent tubes, sodium tubes, xenon tubes, solid state lighting (SSL) devices, and light emitting diodes (LEDs).

9. The method of claim 1, further comprising arranging a clef, key, and time signature on the at least one visual staff, defining one or more frequency bands within a range of frequencies corresponding with the clef and the key, defining one or more regions of the at least one visual staff each corresponding with one of the one or more frequency bands, and associating one or more visual notes with each of the one or more regions of the at least one visual staff.

10. The method of claim 1, wherein including the control sequence in an output data stream further comprises including visual element parameters formatted in one of a Musical Instrument Digital Interface (MIDI), DMX512-A, MIDI Timecode (MTC), and Society of Motion Picture and Television Engineers (SMPTE) standard.

11. The method of claim 1, further comprising:

forming one or more music notes representing an audibly perceived stimuli on one or more music staffs from a music source using the computer processor and the graphical interface;

arranging the one or more visual notes on the at least one visual staff on the graphical interface by correlating the music notes on the one or more music staffs with the one or more visual notes on the at least one visual staff using the computer processor.

12. The method of claim 1, further comprising simultaneously playing music corresponding with one or more music notes included on one or more music staffs included on the graphical interface wherein the one or more music notes are correlated with the one or more visual notes on the at least one visual staff included on the graphical interface and wherein a timing of the music is synchronized with the changes in the representation of the visual display of the visual presentation system included in the one or more icons on the presentation staff using the computer processor.

13. The method of claim 1, further comprising providing haptic or tactile feedback to one or more viewers of the visual presentation using a haptic or tactile feedback system coupled with the output data stream.

14. A method of generating a control sequence for a visual presentation system, the method comprising:

receiving one or more inputs as notations on a graphical interface, the graphical interface generated using a computer processor, the graphical interface comprising a plurality of parallel lines and a plurality of spaces between and adjacent to the plurality of lines, the plurality of parallel lines and plurality of spaces defining at least one visual staff, wherein at least one of the one or more notations is disposed on the at least one visual staff on the plurality of parallel lines or within the plurality of spaces forming at least one visual note representing a visually perceived stimuli associated with at least one visual element of a visual presentation system;

associating one or more timing instructions indicated at least in part by relative positioning of the one or more visual notes on the at least one visual staff with a set of visual element parameters associated with the at least one visual note, the visual element parameters comprising at least one of color, intensity, chromaticity, gamma value, alpha channel, rapidity, duration, hue saturation, red green blue coloring, cyan magenta yellow key coloring, vector position, vector displacement, and brightness;

generating a control sequence from the one or more timing instructions and the at least one visual note on the at least one visual staff;

including the control sequence in an output data stream coupled with the visual presentation system, wherein the control sequence is adapted to operate the visual presentation system;

wherein receiving one or more inputs as notations on the graphical interface further comprises:

forming one or more music notes representing an audibly perceived stimuli on one or more music staffs from a music source using the computer processor and the graphical interface;

arranging the one or more visual notes on the at least one visual staff on the graphical interface by correlating the music notes on the one or more music staffs with the one or more visual notes on the at least one visual staff using the computer processor;

displaying a representation of the visual presentation system on the graphical interface adjacent to the at least one visual staff; and animating the representation with one or more frames generated by the computer processor by following a timing indicated by each of the one or more visual notes and by changing one of the color, intensity, chromaticity, gamma value, alpha channel, rapidity, duration, hue, saturation, red green blue coloring, cyan magenta yellow key coloring, vector positioning, vector displacement, and brightness of a representation of a visual element in the visual display of the visual presentation system in each frame in response to encountering a position of each of the one or more visual notes on the at least one visual staff.

15. The method of claim 14, further comprising:

associating one or more dynamic instructions with one or more dynamic elements included in the one or more notations where the one or more dynamic elements are associated with the at least one visual note; and wherein generating the control sequence from the one or more timing instructions further comprises including the one or more dynamic instructions in the control sequence in association with the one or more timing instructions associated with the at least one visual note.

16. The method of claim 15, further comprising:

defining at least one of the intensity, chromaticity, gamma value, alpha channel, rapidity, duration, hue, saturation, red green blue coloring, cyan magenta yellow key coloring, vector positioning, vector displacement, and brightness of a visual element in a visual display of the visual presentation system using one or more of the one or more dynamic instructions in the control sequence; and defining a display duration of the visual element in the visual display of the visual presentation system using the one or more timing instructions.

17. The method of claim 16, wherein generating the control sequence from the one or more timing instructions further comprises:

generating a Musical Instrument Digital Interface (MIDI) channel, MIDI note on command, and MIDI note off command for each of the one or more timing instructions and generating a corresponding DMX512-A universe channel value and an intensity value corresponding with the generated MIDI channel, MIDI note on command, and MIDI note off command; and including the DMX512-A universe channel value and the intensity value in the control sequence, the DMX512-A universe channel value corresponding with a tube number associated with a light element in the visual display of the visual presentation system;

wherein the light element is selected from the group consisting of neon tubes, incandescent lights, metal halide tubes, fluorescent tubes, sodium tubes, xenon tubes, solid state lighting (SSL) devices, and light emitting diodes (LEDs).

18. The method of claim 14, further comprising simultaneously playing music corresponding with one or more music notes on the one or more music staffs included on the graphical interface wherein the one or more music notes are correlated with the one or more visual notes on the at least one visual staff and wherein a timing of the music is synchronized with the changes in the representation of the visual display of visual presentation system included in the one or more icons on the presentation staff using the computer processor.

19. The method of claim 14, further comprising providing haptic or tactile feedback to one or more viewers of the visual presentation using a haptic or tactile feedback system coupled with the output data stream.

20. A control interface for a visual presentation system comprising:

a graphical interface coupled with a computer processor, the graphical interface comprising a plurality of parallel lines and a plurality of spaces between and adjacent to the plurality of lines, the plurality of parallel lines and plurality of spaces defining at least one visual staff, wherein one or more visual notes representing a visually perceived stimuli associated with at least one visual element of a visual presentation system are disposed on the at least one visual staff on the plurality of parallel lines or within the plurality of spaces;

an output data stream comprising a control sequence of one or more visual element parameters adapted to operate a visual presentation system comprising at least one of color, intensity, chromaticity, gamma value, alpha channel, rapidity, duration, hue, saturation, red green blue coloring, cyan magenta yellow key coloring, vector positioning, vector displacement, and brightness, the control sequence corresponding with the one or more visual notes on the at least one visual staff and a timing sequence indicated at least in part by relative positioning of the one or more visual notes on the at least one visual staff, the output data stream coupled with a visual presentation system; and one or more music notes representing an audibly perceived stimuli on one or more music staffs included on the graphical interface adjacent to the at least one visual staff, the one or more music notes correlated with the one or more visual notes on the at least one visual staff;

defining a display duration for a visual element in a visual display of the visual presentation system using the one or more timing instructions;

generating a Musical Instrument Digital Interface (MIDI) channel, MIDI note on command, and MIDI note off command for each of the one or more visual element parameters and generating a corresponding DMX512-A universe channel value and an intensity value corresponding with the generated MIDI channel, MIDI note on command, and MIDI note off command; and including the DMX512-A universe channel value and the intensity value in the control sequence, the DMX512-A universe channel value corresponding with a tube number associated with a light element in the visual display of the visual presentation system;

wherein the light element is selected from the group consisting of neon tubes, incandescent lights, metal halide tubes, fluorescent tubes, sodium tubes, xenon tubes, solid state lighting (SSL) devices, and light emitting diodes (LEDs).

21. The system of claim 20, further comprising one or more icons comprising a representation of a visual display of the visual presentation system on a presentation staff included on the graphical interface adjacent to the at least one visual staff, where the representation corresponds with an appearance of the display of the visual presentation system, and comprises one or more frames.

22. The system of claim 20, wherein a portion of the graphical interface comprises a representation of the visual display of the visual presentation, wherein the representation comprises one or more frames included in a video image of the operation of one or more visual elements in the visual display of the visual presentation system, the one or more frames generated using the visual element parameters in the control sequence.

23. The system of claim 20, wherein the visual display of the visual presentation system comprises one or more light elements selected from the group consisting of neon tubes, incandescent lights, fluorescent tubes, sodium tubes, metal halide tubes, xenon tubes, solid state lighting (SSL) devices, light emitting diodes (LEDs), and video images.

24. The method of claim 20, further comprising arranging a clef, key, and time signature on the at least one visual staff, defining one or more frequency bands within a range of frequencies corresponding with the clef and the key, defining one or more regions of the at least one visual staff each corresponding with one of the one or more frequency bands, and associating one or more visual notes with each of the one or more regions of the at least one visual staff.

* * * * *